July 28, 1964  G. R. PIPES  3,142,078
FASTENER AND WASHER ASSEMBLY MACHINE
Filed Jan. 23, 1961  7 Sheets-Sheet 1

FIG. 1

INVENTOR
GEORGE R. PIPES
BY
ATTORNEYS

July 28, 1964  G. R. PIPES  3,142,078
FASTENER AND WASHER ASSEMBLY MACHINE
Filed Jan. 23, 1961  7 Sheets-Sheet 2

FIG. 2

INVENTOR
GEORGE R. PIPES
BY
ATTORNEYS

July 28, 1964 G. R. PIPES 3,142,078
FASTENER AND WASHER ASSEMBLY MACHINE
Filed Jan. 23, 1961 7 Sheets-Sheet 3

INVENTOR.
GEORGE R. PIPES
BY
ATTORNEYS

July 28, 1964 G. R. PIPES 3,142,078
FASTENER AND WASHER ASSEMBLY MACHINE
Filed Jan. 23, 1961 7 Sheets-Sheet 4

INVENTOR
GEORGE R. PIPES

BY
ATTORNEYS

July 28, 1964

G. R. PIPES

3,142,078

FASTENER AND WASHER ASSEMBLY MACHINE

Filed Jan. 23, 1961

INVENTOR.
GEORGE R. PIPES
BY
ATTORNEYS

United States Patent Office

3,142,078
Patented July 28, 1964

3,142,078
FASTENER AND WASHER ASSEMBLY MACHINE
George R. Pipes, South Euclid, Ohio, assignor to Eaton Manufacturing Company, Cleveland, Ohio, a corporation of Ohio
Filed Jan. 23, 1961, Ser. No. 84,055
20 Claims. (Cl. 10—155)

Broadly, this invention relates to the provision of an improved fastener assembly machine but more specifically, pertains to a novel washer pickup device and telescoping means for assembling same with a fastener.

Heretofore, numerous assembling machines have been utilized in the fastener art for securing a washer to a nut or bolt. These machines have incorporated into their operation, many devices and methods for feeding washers to the machines, telescopically assembling the washer onto the nut or bolt and ejecting the assembled unit either in its completed form or transferring the assembled unit to a thread rolling means which, in the case of a bolt, will roll a thread onto the shank portion, completing the unit, or in the case of a nut, thread same. Generally, nuts are pre-threaded before assembling and the additional step is not necessary.

Irrespective of the condition of the bolt or nut prior to its assembly with a washer, these machines incorporate into their basic operation various mechanisms for assembling the washer whether helical or Belleville in shape, onto the nut or bolt, as the case may be. A few of the known assembling devices consist of a means of providing at least two rotating wheels or discs having parallel axes whereby the wheels have their axes so arranged that the circumference of one wheel will upon rotation, carry a nut or a bolt in a manner such that the nut or bolt will be transferred from one wheel to the other wheel and during the transfer, effect the formation of the assembled unit. Further known assembling operations include such steps as feeding strip stock to a machine whereby the actual forming of the washer takes place subsequent to the assembly. In this type of operation, a device, either by a punching step or a telescoping operation, functions to direct the nut or the bolt into engagement with the washer and subsequently punch through the strip stock to form the washer effecting the completed assembly.

As above set forth, there are numerous approaches in providing successful assembly operations which in turn encounter various problems. These problems become centralized particularly in the manner of synchronizing the feeding of the elements to the machine in order that the assembly may take place at a predetermined rate. The problem of synchronization arises in machines of the type wherein forming operations are part of the assembling steps and is effective to increase or decrease the output of the machine depending upon how successfully it is solved. Various subordinate problems to the synchronizing of the to-be-assembled elements arise whereby the speed of each of the elements must be maintained at a predetermined rate. For example, in the problem of telescoping a bolt through a washer to be secured thereto, it is necessary that the speed and feed of the units be such that proper alignment will occur to allow the assembly to take place.

In the event that the feed is not consistent or interrupted, the absence of one washer or the misalignment of a series of washers may cause the machine to cease assembling the elements completely. In the case of a machine utilizing rotating wheels or discs, the parts of the machine functioning to perform the assembling operation must be positioned in a precise manner to insure proper transfer of the elements carried thereby. If a machine of this type is jarred in operation or is not set up under critical control limits, the axes of rotation of the wheels may become misaligned sufficiently to permanently damage or require a subsequent setup resulting in excessive down time.

The novel concept presented herein is a means to obviate problems now prevalent in present day assembly machines particularly in the critical synchronizing of the speed and feed of the elements and the critical positioning of essential parts.

Therefore, it is the principal object of this invention to provide a fastener and washer assembling device whereby the synchronization of the two elements to be assembled is independent of their feed rate and the synchronization of the elements is accomplished by a novel arrangement of cooperable parts of the mechanism.

It is an object of this invention to provide a fastener and washer assembling means incorporating into the assembly operation a novel combination washer pickup and telescoping means which insures proper washer and fastener alignment.

Another object of this invention is to provide a novel fastener and washer assembly device which incorporates therein the steps of rotating a unit about a cam surface operable to pick up the washer element, telescopingly place the washer in alignment with the threaded fastener, assemble the washer to the threaded fastener and return for a subsequent washer pickup with the assembling occurring at a rate dependent upon the number of rotating units incorporated into the rotating means and independent of the rate of feed of stock to the assembling machine.

It is a further object of this invention to provide a novel fastener and washer assembling device which is simple in operation requiring a minimum amount of adjustment effective to prevent excessive down time.

These and other objects of the invention will become more apparent from the following description taken in connection with the accompanying drawings wherein.

Figure 1:
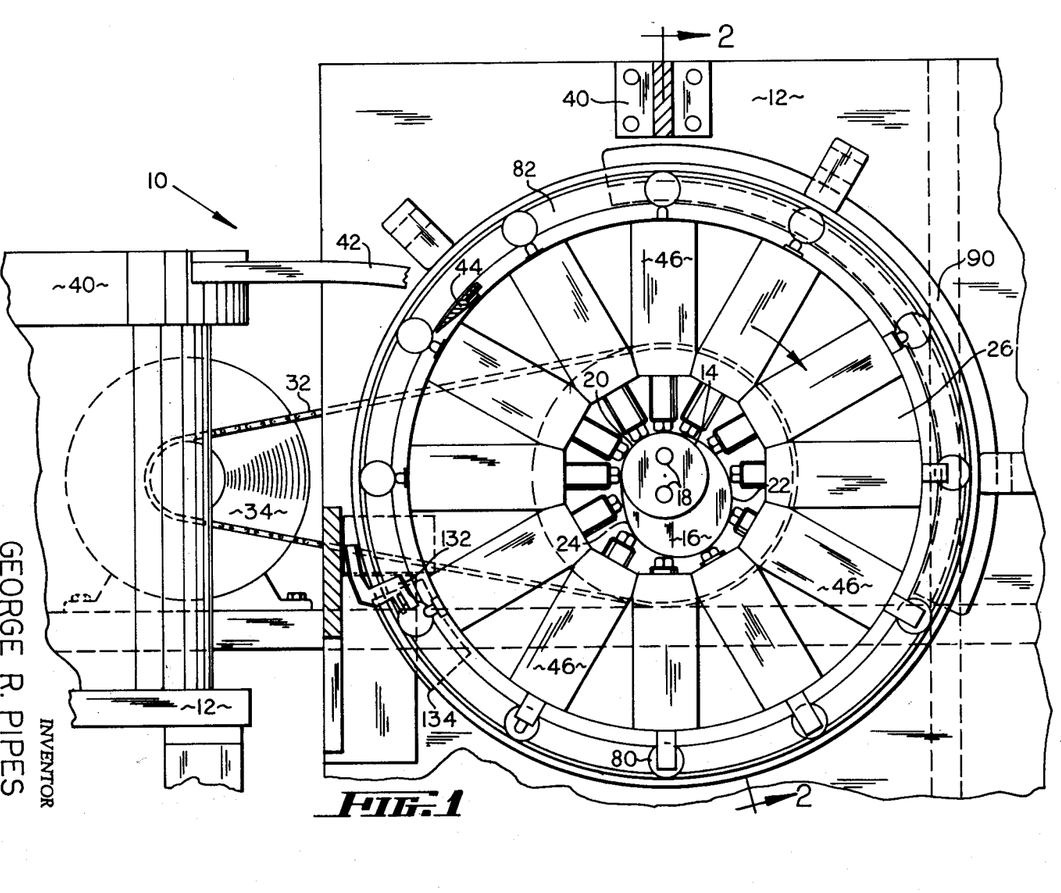
FIGURE 1 is a top view of the novel fastener and washer assembly machine illustrating therein the washer pickup means, the assembling unit and the motivating means associated therewith.
Figure 2:
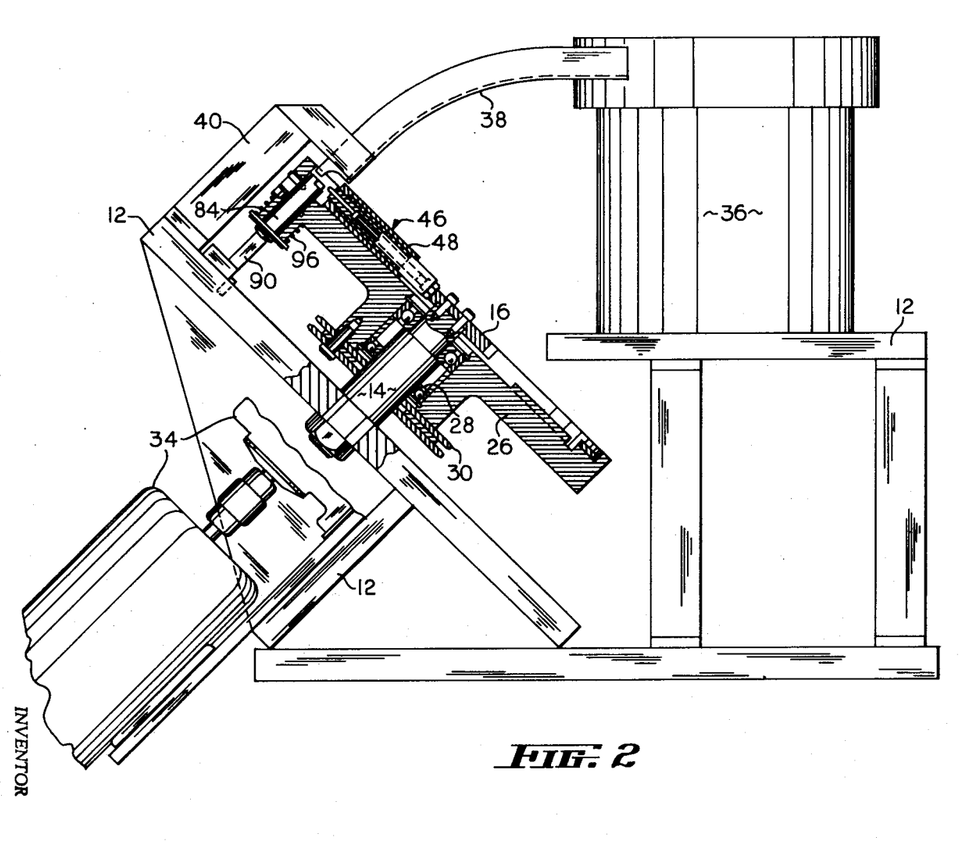
FIGURE 2 is a cross-sectional view of the novel fastener and washer assembly machine taken along line 2—2 of FIGURE 1.

The assembly of a fastener of the bolt type with a helical washer is illustrated in FIGURES 1–9 and the structure involved therein is described as follows. Referring to FIGURES 1 and 2 of the drawing, the assembling machine 10 comprises a frame or support means 12 having a centrally located support shaft 14 positioned thereon and adaptable to receive a stationary cam member 16 fixed thereto by screws 18. The cam member 16 has a base portion 20 corresponding to the base circle of common cam surface formation, a rise portion 22 and a fall portion 24 thereon based upon a clockwise rotation of the follower unit thereabout. The follower unit comprises a rotatable table 26 mounted about the support shaft 14 by a bearing structure 28 and encompassing the stationary cam member 16 operable to rotate thereabout in a clockwise direction. A pulley 30 is secured to one end of the rotatable table 26 and is operable to receive a chain, belt or other suitable motion transmitting means 32 therearound. The chain 32 is engageable with a power source 34 and upon actuation of the power source, will transfer linear motion therethrough to the pulley 30 and rotate the table 26 about the stationary support shaft 14 and cam member 16. The power source 34 is secured to the base or frame member 12 as shown clearly in FIGURES 1 and 2.

Figure 3:
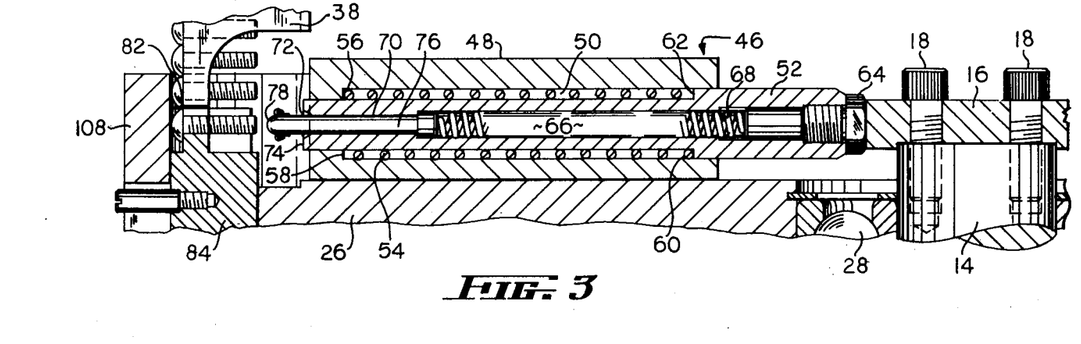
FIGURE 3 is an enlarged cross-sectional view of the novel washer pickup and assembly mechanism illustrating the device after a successful pickup has been completed.
Figure 4:
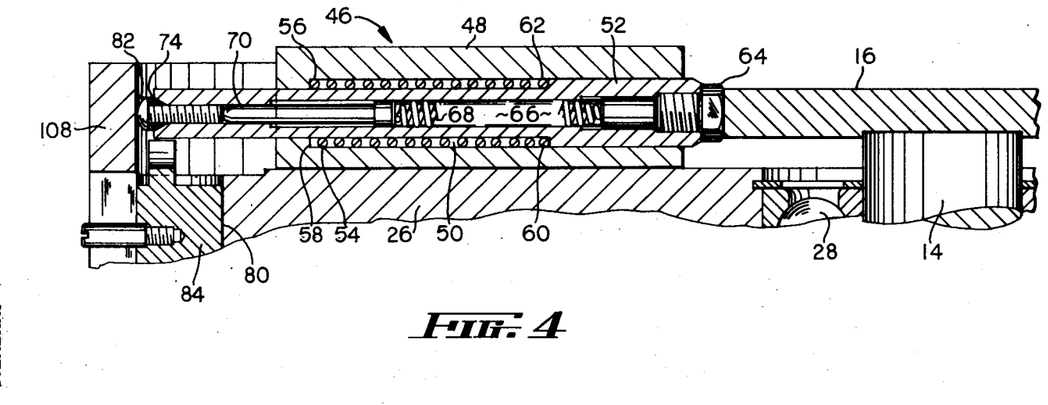
FIGURE 4 is an enlarged cross-sectional view of the novel washer pickup means illustrating therein the assembling of the washer onto a bolt.

Washer and fastener feeding elements are positioned about the rotating table whereby the bolts are delivered to the rotating table from a hopper 36 (FIGURE 2) through a chute or ramp guide and outlet 38 extending therefrom and disposed in a radially spaced position with respect to the cam member 16 and adaptable to feed fasteners therethrough. The feeder hopper and ramp function to pre-arrange the positioning of the bolt on the table where the bolt body is directed radially inwardly toward the cam 16 and each and every bolt delivered thereafter is so orientated (FIGURE 3).

A support arm 40 is fixed to the frame member 12 and extends in a direction parallel to the axis of rotation of the table 26 and engages the feeder guide and outlet 38 to maintain same in a rigid fixed position with respect to the rotating table. The hopper 36 is illustrated in FIGURE 2 as being supported on the base or frame member 12.

The washer which is made of molded nylon is delivered to the rotating table 26 from a hopper 36, shown in FIGURE 1, through a feeder guide 42 which in turn directs the nylon washer to the rotatable wheel through an outlet 44 mounted and functioning cooperably with the novel washer pickup means. It is to be understood that the washer utilized in this application is merely indicative of one type of washer which can be used for assembly purposes. The assembling machine functions equally well with washers of the helical or Belleville type including washers made of steel, nylon or other deformable material. For purposes of illustration, the washers utilized herein are made of nylon molded into the illustrated form and positioned with respect to the machine in a manner which will be hereafter set forth. The rotating table 26 as illustrated in FIGURES 1 and 2 has an axis forming an angle with the horizontal base portion of the frame 12 and is arranged such that the feeder elements of the machine can be placed in accessible position for maintenance purposes. Accordingly, the feeder hoppers 36 and 40 can be arranged with respect to the tilted axis of the assembling machine such that the height of the hopper will not extend substantially above the assembling machine.

Radially extending from and circumferentially spaced about the cam 16 on the rotatable table 26 are a series of washer pickup units 46. These units are more clearly illustrated in FIGURES 3–6 of the drawing with each one being identical in structure. The unit 46 comprises a housing 48 having a chamber 50 formed therein. A plunger 52 is disposed within the chamber 50 and is capable of reciprocatory movement therein. A coil spring 54 has one end thereof 56 engageable with a shoulder 58 formed on the housing 48 while the other end 60 is engageable with a shoulder 62 formed on the plunger 52 and disposed within the chamber. A threaded screw 64 is receivable in a threaded portion of plunger 52 and has a head portion which acts as an abutting means engageable with the stationary cam member 16. A chamber 66 is formed within the plunger 52 and has a coil spring 68 disposed therein. At one end of the plunger remote from the screw 64 is a passage 70 having a chamfered opening 72 formed in an end surface 74 thereof. Disposed in the passage 70 engageable with one end of the coil spring 68 and operable to reciprocably move therein is a pin 76 extending through the opening 72 and responsive to the resilient force of coil spring 68. The pin 76 has an end portion 78 thereon which is adaptable to receive a washer thereon for the pickup operation.

Radially spaced from and in alignment with the washer pickup units 46 are a series of bores 80 (FIGURES 5 and 6) formed in the table 26. The bores extend in a direction substantially parallel to the axis of rotation of the shaft 14 and open at one end thereof into an annular surface 82 of the table. Disposed in the bores 80 are a series of plungers 84 operable to reciprocate in the bores 80 responsive to the rise 86 and fall 88 surfaces of a cam 90 in engagement with one end 92 of the plunger. The cam 90 (FIGURES 1, 2, 5 and 6) is secured to the frame 12 and functions to reciprocate the plunger during a portion of the assembling cycle. A compression coil spring 96 is disposed intermediate the rotatable table 26 and a washer 98 fixed to the plunger end portion by a clip ring 99. The spring 96 functions to maintain the plunger in a position whereby the upper end portion 100 thereof is at a height lower than the surface 82 of the rotatable table 26. A U-shaped opening 102 is formed in the upper portion 100 of the plunger and is adaptable to receive a bolt 104 therein. A slotted opening 106 is formed in the radial peripheral portion 108 of the table 26 and is adaptable to receive a pin 110 therein. The pin 110 is secured to the plunger and is guided in its movement by the opening 106 which allows the plunger to reciprocate in the bore 80 but prevents any rotative movement thereof. The slotted opening 106 therefore acts as a guide for the plunger reciprocation and also restricts its reciprocating movement within the bore in an axial direction. This slotted opening insures that the bolt once positioned correctly on the plunger will be maintained in proper position throughout the assembly operation.

In structurally defining the elements of the assembling machine and in pointing out their relative placement with respect to one another, several factors must be kept in mind. It is essential in the positioning of the reciprocable pin member 76 with respect to the bolt carrying plunger 84 and the U-shaped recess 102 that the pin 76 and the screw be coaxially disposed during the assembling steps. The location of the plunger member 84 with respect to the surface 74 on the plunger 52 must be such that upon assembling the washer with the bolt, the radial assembling movement of the plunger 52 must not be interfered with by the bolt carrying follower 84. Further, the diameter of the pin 76 must be substantially equal to or greater than the diameter of the bolt 104 in that the opening 72 disposed in the plunger must be dimensioned to receive the bolt therein.

FIGURES 1, 3, 5 and 7 illustrate the means utilized in feeding the fasteners and washers directly to the assembling machine.

FIGURES 1 and 2 depict the overall arrangement of the feeding units with the assembling means while the remaining figures show the feeder elements and their individual relationship to the machine.

Figure 5:
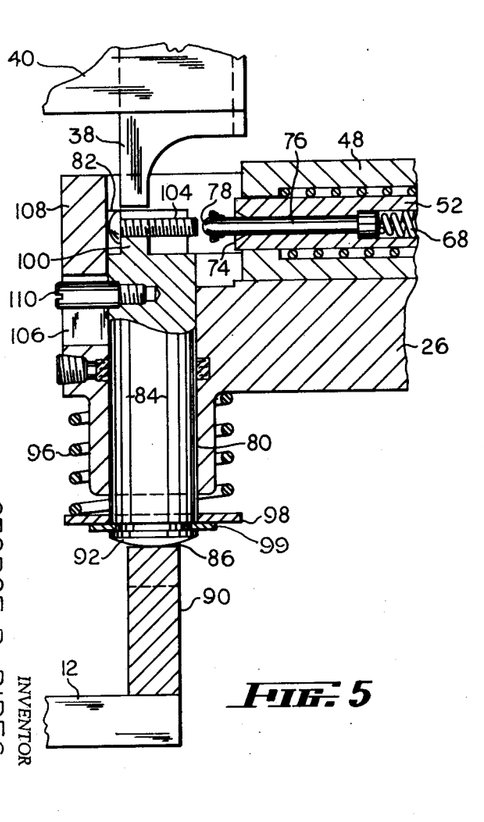
FIGURE 5 is an enlarged cross-sectional view of the washer pickup means and the fastener holding means illustrating thereon the relative positioning of the assembling units.

From FIGURES 1, 3 and 5, the fastener is introduced into the operating cycle of the assembly at the stage of rotation of the wheel when the plunger 84 rides the cam 90. The cam 90 brings the plunger 84 into position to receive the screw as it is dropped from the feeder guide and outlet. The bolt feeder guide and outlet 38 is positioned directly above the rotating surface 82 of the table until the U-shaped recess 102 of the follower plunger 84 is disposed in axial alignment with the end of the feeder 38. At this point, the cam 90 on which the follower plunger rides is positioned in relationship to the rotating table between the base and a maximum rise point of the cam 16 to insure that the fastener will be in position when the radial movement of the plunger 52 begins in the assembling operation. Since the bolt feeder outlet 38 is disposed adjacent to the surface 82, the distance therebetween is insufficient to allow the release of a bolt until such time that an empty recess 102 is positioned beneath the outlet as provided by the continuous table rotation.

Figure 7:
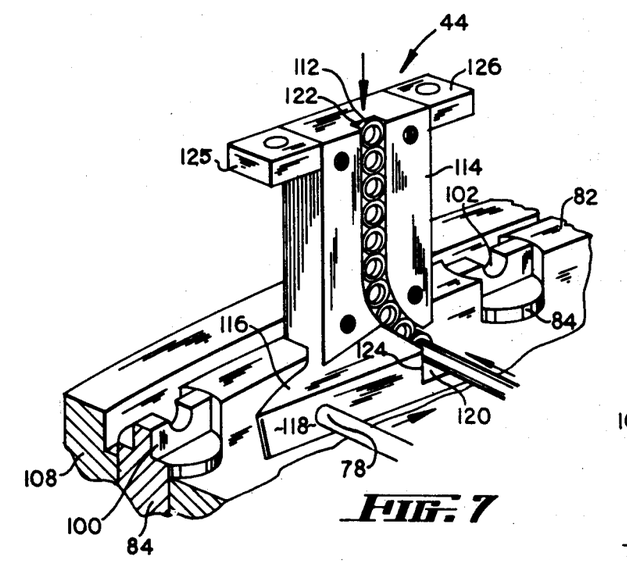
FIGURE 7 is an isometric view of the feeding mechanism which positions the washers relative to the washer pickup means prior to assembly with the fastener, including a partial view of the fastener holding means in relation to the washer pickup means.

FIGURE 7 is an isometric view which clearly illustrates the manner in which the washers are fed to the machine.

The washers 112 are fed to the machine prior to the receiving of the bolt on the plunger 84. This time relationship is predetermined since the washer positioning relative to the point of pickup is restricted only in that it cannot be positioned for pickup later than at the stage of rotation of the units 46 where the cam engaging end 64 of the plunger 52 reaches the rise surface 22 of the cam 16. From this positioning of the washers and bolts, it can be seen that the assembling operation occurs on the rise portion 22 of the stationary cam 16. The feeding of these units therefore must take place prior to the reaching of the rise portion of the cam and after the station at which the assembled parts leave or are ejected from the machine.

The washer feeder 44 of FIGURE 7 has a central portion 114 thereon disposed radially intermediate the washer pickup units 46 and the follower plunger 84. The central portion 114 comprises an end portion 116 formed in a manner whereby a cam surface 118 is disposed thereon adaptable to engage the end 78 of the pin 76. This cam surface is directed radially inwardly toward the stationary cam 16 and is positioned such that upon engagement with the end of the pin, the pin will be directed radially inwardly into the plunger opening 72 against the resilient force of the spring 68. The feeder end has a recess 120 therein into which the washer elements are positioned after following a track 122 formed in the feeder along the longitudinal length thereof.

The recess is of a width substantially equal to the overall thickness of the washer. An edge 124 is formed between the recess and the surface portion 118 of the feeder. Flanges 125 and 126 extend outwardly from the end portion of the feeder outlet and secure same to the feeder guide 42.

Figure 8:
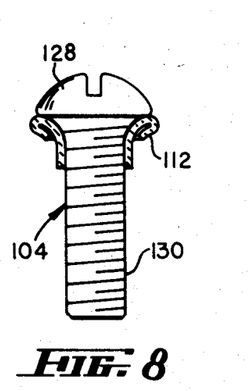
FIGURE 8 is a side view of the assembled fastener and washer elements.

The assembled washer and bolt in FIGURE 8 of the drawing clearly illustrates the position of the washer 112 with respect to the head 128 and stem 130 portions of the bolt 104.

The ejecting means 132 (FIGURE 9) utilized herein functions to remove the assembled unit from the rotating wheel. After completion of the assembly operation, the washer and bolt are engaged by the plunger 84 in the U-shaped recess 102. The plunger 84 at this point of operation of the cycle engages a cam 134 positioned axially beneath the table and cooperably functions with the pin 76 and plunger 52 to position the unit for ejection purposes. The plunger raises the assembled unit above the surface 82 responsive to the rise portion 136 on the cam whereby a pair of curved arms 138 and 140 engage the head 128 and body 130 of the bolt respectively. The arms 138 and 140 are separated by a notch 142 formed in the ejector which allows the end portion 100 in which the U-shaped recess 102 is located to pass therebetween and enables the extended arms to be positioned beneath the head and body portion of the bolt.

Figure 9:
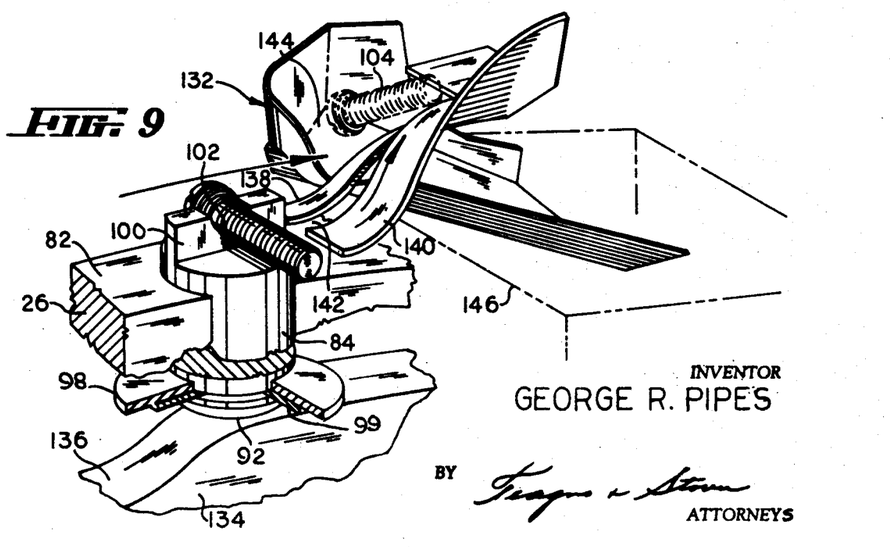
FIGURE 9 is an isometric view of an assembled washer and fastener stationary ejecting means as positioned relative to the assembling device and is shown as being operable to receive the assembled fastener and washer thereon and eject same from the machine.

The assembled washer and bolt is lifted by the arms out of the recess 102 until gravity causes the sliding of the bolt from the arms onto a ramp 144 which in turn will direct the unit into a suitable hopper or container 146 disposed adjacent the machine. The particular structure disclosed herein is merely exemplary of an ejecting means and any other suitable structure could be readily substituted therefor.

To more clearly understand the details of this novel machine and the function of the various elements, a description of the operation of the bolt and washer assembly is as follows. The hoppers 36 and 40 are first filled with the completed finished elements of the assembly; that is, hopper 36 is loaded with bolts and hopper 40 is loaded with nylon washers. Suitable actuating means can be utilized which operate to feed the bolts and washers down the feeder outlets 38 and 42, respectively, whereby the units are delivered to the assembling table 26 in one-by-one sequence. Upon actuation of the power source 34, movement to the chain or belt 32 is initiated and rotative movement is imparted to the pulley 30 secured to the table. Due to the mounting of the table with respect to the shaft 14, the assembling table 26 is rotated at a speed directly proportionate to the speed of the motor about the shaft 14. Viewing the assembling operation in the functioning of one unit; as the table rotates about the stationary cam 16, the washer pickup unit 46 engages the base circle 20 of the cam and is maintained in engagement by coil spring 54. As the table continues to rotate, the end 78 of the pin 76 engages the cam surface 118 of the feeder. The rotation of the table and the position of the washer pickup unit 46 of the surface 118 directs the pin 76 radially inwardly toward the cam 16 against the reaction of the spring 68 disposed in the chamber 66 of the plunger unit 52. Upon reaching the edge 124 of the surface 118, the pin end 78 will be disposed in a radially outward direction by the force of the spring and accordingly, telescopingly engage a washer 112 located in the recess 120 from which it is picked up by the pin.

Figure 6:
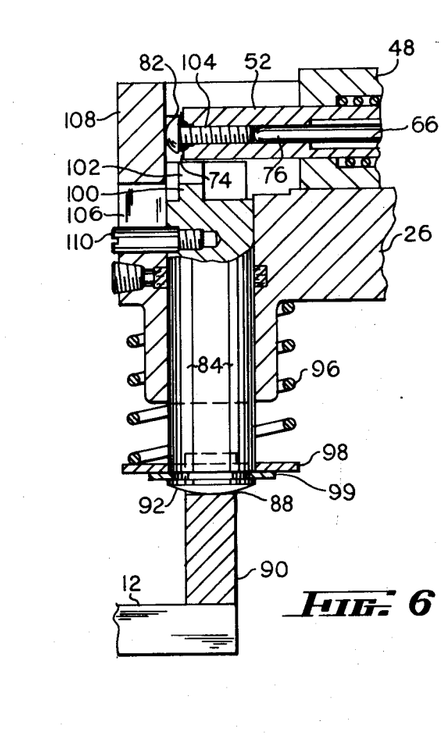
FIGURE 6 is an enlarged cross-sectional view of the assembling means illustrating therein the washer pickup means in position upon the assembling of the washer onto the fastener further illustrating the relative position of the fastener holding means with respect to the washer pickup means.

As the table continues travelling in an arcuate path, the one end 92 of the plunger 84 engages the cam member 50. Upon engagement with the cam, the plunger is immediately raised to a height whereby the top of the bolt holding portion 100 formed on the plunger end is level with the surface 82 of the table and is now in position to receive one bolt from the feeder outlet 38. When the U-shaped recess 102 of the plunger end portion 100 is directly beneath the end of the feeder outlet, gravity causes one bolt to drop in the recess and accordingly, the table has thereon the elements which are to be assembled. Further arcuate movement of the table in a clockwise direction positions the unit 46 in radial alignment with the rise portion 22 of the cam 16 and the rise is now engaged by the threaded member 64 of the plunger 52. The plunger by this engagement is progressively moved in a radially outward direction until the end of the pin 78 on which the washer is disposed engages the end of the body 130 of the bolt. Upon contact, the bolt is moved slightly in a radially outward direction until the head portion 128 rests against the inner surface of the bore 80 which acts as an abutting means therefor. At this point, the radial outward movement of the plunger increases as the rise on the cam increases until the body portion of the bolt forces the pin radially inwardly into the opening 72 of the plunger along the passage 70 formed therein and against the reactive force of the spring member 68. Following the pin, the body of the bolt enters the opening 72 and the passage 70, until the pin is entirely recessed in the passage. Thus the washer originally disposed on the pin is transferred to the bolt body by the reaction surface 74 on the plunger 52. As the bolt stem continues to force the pin inwardly, the washer is guided outwardly by the surface 74 while the bolt telescopingly guides the washer thereon by the continued radial outward movement of the plunger 52 responsive to the cam rise portion. Upon further movement of the pickup unit 46 along the rise portion 22 of the cam 16, the plunger 52 is radially directed outwardly to a point where the surface 74 of the plunger is about to engage the bolt carrying follower plunger 84 at the end portion 100 thereof. Interference engagement between these members is anticipated and the follower plunger 84 is moved out of the path of plunger 52. This movment is due to the reaction of the spring 96 and the fall 88 of the cam 90, the plunger is directed downwardly parallel to the axis of rotation of the wheel until the end portion 100 is dropped a substantial distance allowing the radially moving plunger 52 to pass thereover (FIGURES 5 and 6). At this stage of table rotation, the the cam rise portion 22 is at the maximum and the plunger 52 is moved radially outwardly until the washer 112 engages the head 128 of the fastening means and accordingly, the assembly is completed.

Upon further rotation of the table, the fall portion 24 of the cam is now engaged and the plunger 52 recedes radially inwardly due to the return rate of spring 54 located in chamber 50 of the unit housing 48. In like manner, the movement of the plunger allows the spring 68 to release a portion of the force created by the inward pin movement to subsequently direct the pin radially outwardly and the assembled washer and bolt radially outwardly. When the bolt and washer extend substantially out of the passage 70 but are still firmly held thereby the second cam 134 is engaged by the follower plunger 84 end portion 92. The plunger 84 is next directed axially outwardly responsive to the rise portion 136 of the cam until the assembled unit is disposed in the U-shaped recess 102. As positioned, the assembled unit is directed outwardly until it extends a distance substantially equal to or greater than the diameter of the head of the bolt above the surface 82. The arms 138 and 140 of the ejection unit 132 next engage the bolt and accordingly, the completed assembly is lifted from the recess 102 up the arms onto the ramp 144 and down into the hopper 146 located adjacent the machine.

Each of the pickup units operate in the identical manner and because of this identity, are able to increase or decrease the output of the machine depending upon the number of units disposed circumferentially on the table. If the table size is increased substantially in diameter to allow additional units thereon, the assembly rate of the machine can be increased. It is essential that in the operation of the machine the speed of rotation of the table be maintained whereby the pickup action effected by the rate of the coil spring 68 disposed in the plunger 52 be operable at rotative speeds which are not extreme and which would not cause irreparable damage and wear to the units.

Increased spring rates as well as an increased number of washer pickup units and follower plungers are all variables which can be altered as to their number and value to effect an increased assembly output of the machine.

Figure 10:
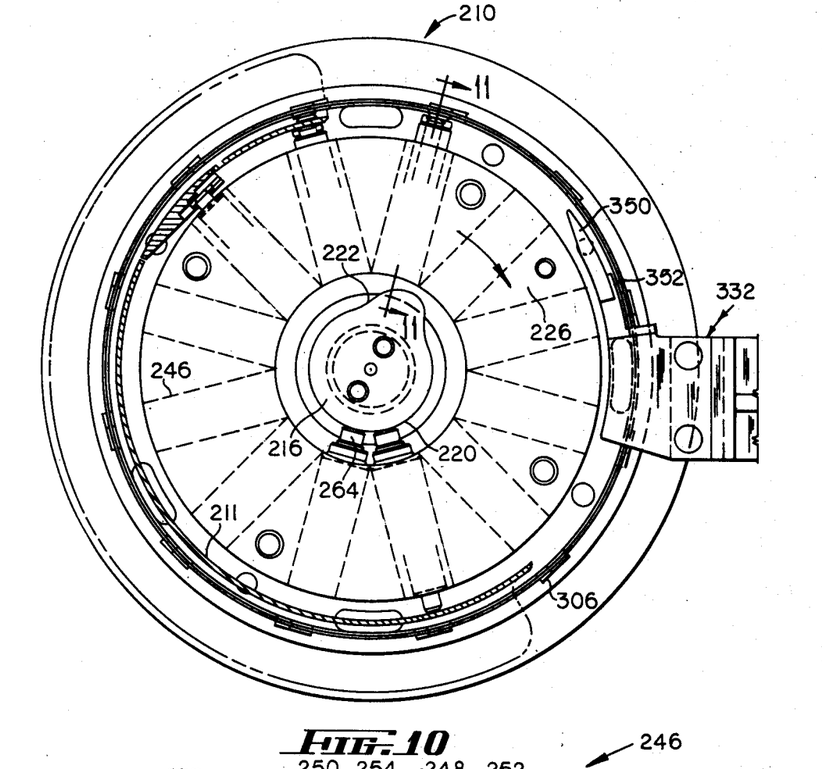
FIGURE 10 is a top view of the novel assembling machine adapted to receive the nut and washer elements for assembly thereby.

The basic features and operating principles of the inventive machine can be incorporated into the assembling of a fastener of the nut and washer type whereby changes in the machine can be effected which will direct the assembling operation to accommodate this type of fastener. The change is depicted more clearly in FIGURES 10, 11 and 12 which illustrate the type of structure utilized to perform the necessary assembly operation. The character references referred to in the nut and washer assembly machine refer to in numerical equivalents, the reference numerals appearing in the description of the bolt and washer assembling machine illustrated in FIGURES 1–9 and begin in the two-hundred series.

The novel assembly machine 210 (FIGURE 10) comprises a table 226 mounted for rotation about a stationary cam 216 having a base 220, a rise 222 and a fall portion thereon. The specific configuration of the cam is slightly different from that of the cam 16 utilized in the washer and bolt assembly in that the maximum radial extension of the washer pickup unit 246 is increased by the increase of the rise portion 222 of the cam 216. (The reason for this structural difference will become apparent from the following description and operation sequence.)

The washer pickup units 246 (FIGURE 11) circumferentially spaced about the table 226 comprises a housing 248 having a chamber 250 formed therein. A reciprocable plunger 252 is disposed in the chamber 250 responsive to the resilient action of a spring 254 disposed in the chamber and engageable with a shoulder forming a part of the housing 248. A member 264 is disposed in an opening in one end of the plunger and has a head thereon forming part of a threaded portion receivable in a threaded opening in the member engageable with the cam 216. The head acts as an abutting means and is operable to impart movement to the plunger responsive to cam engagement.

Figure 11:
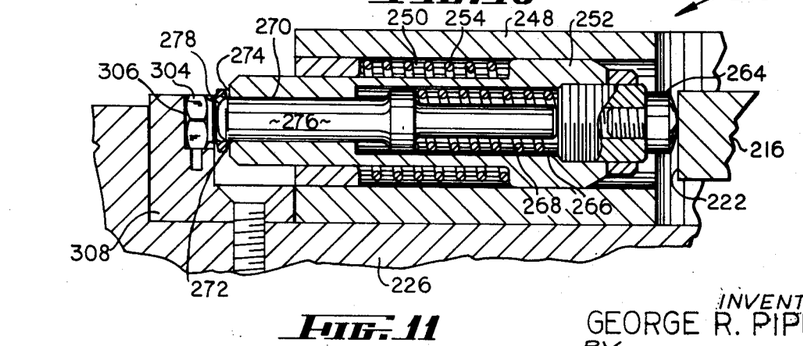
FIGURE 11 is an enlarged cross-sectional view of the washer pickup means utilized in the assembly of the nut and washer elements taken along line 11—11 of FIGURE 10.

A chamber 266 is formed by the plunger and is communicable with a passageway 270 extending outwardly from the chamber forming an opening 272 in a surface 274 on one end of the plunger. A cylindrically shaped pin member 276 is disposed in the chamber 266 and is operable to reciprocate in the passageway 270 responsive to the plunger movement and a coil spring 268 is disposed in the chamber encompassing a portion of the pin. The pin 276 is engageable with the end 264 of the plunger at such time when the coil springs 254 and 268 are substantially compressed by the cam and pin movements in their respective chambers and the pin is operable to be outwardly moved by this engagement. An end portion 278 is formed on the pin having a diameter less than the diameter of the washer which is to be engaged thereby.

The nuts 304 which are fed to the table have a threaded opening therein and an annular flange 310 extending from the nut disposed about one end of the opening. The nuts are fed to the table by a hopper and feeder chute or outlet (not shown) and are receivable in recesses 306 formed in the peripheral shoulder portion 308 of the table. These recesses are formed so as to be in radial alignment with the washer pickup units 246 whereby the threaded openings in the nuts have their origins on axes coaxial with that of the pins 276. The feeder outlet is positioned relative to the table such that only one nut at a time will be released from the outlet into the recesses 306 with each nut being delivered to the recess with the flange 310 facing the pin 276 of the unit 246.

Figure 12:
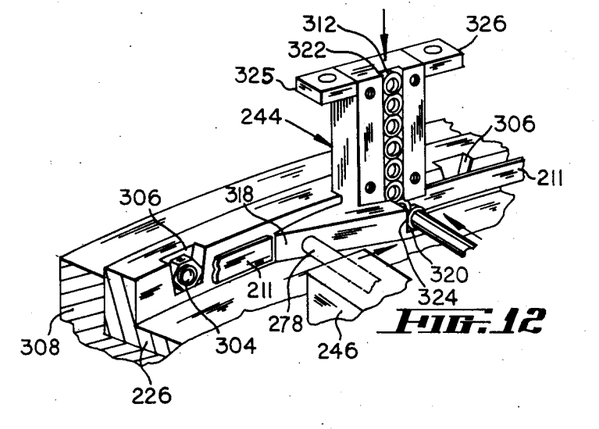
FIGURE 12 is an isometric view of the positioning of the washer feeding means and the relative location or positioning of the novel washer pickup means with respect to one another and the positioning of the nut with respect thereto.
Figure 13:
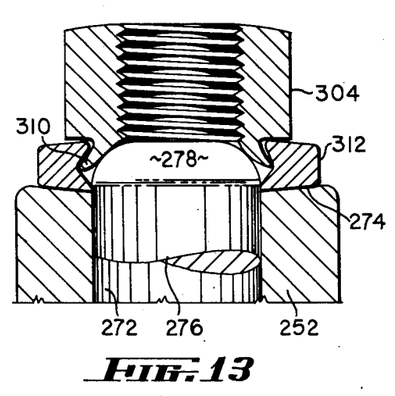
FIGURE 13 is an enlarged cross-sectional view of the assembly operation wherein the washer is disposed in contact engagement with respect to the nut in assembled arrangement therewith.
Figure 14:
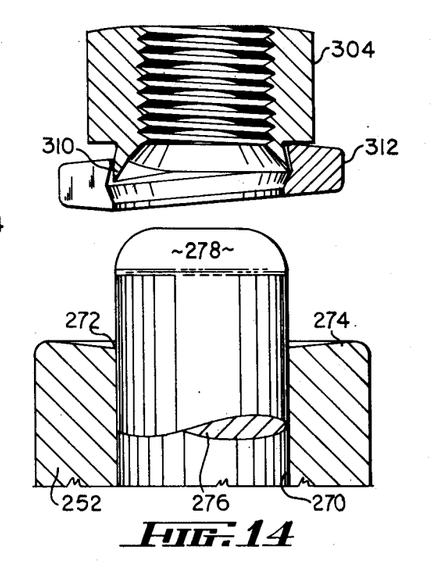
FIGURE 14 is an enlarged cross-sectional view illustrating the fastener as assembled and the relative location of the assembling means with respect to the assembled unit.
Figure 15:
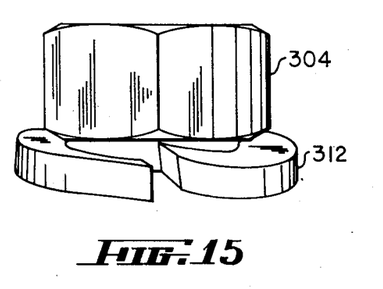
FIGURE 15 is an enlarged view of the fastener and washer as assembled.

Disposed radially intermediate the nut recesses 306 and the washer pickup units 246 are stationary guide members 211 and a washer feeder outlet 244 (FIGURE 12). The guide comprises an arcuately shaped member with a radius of curvature less than that of the table but having its origin coincident therewith. The guide is engageable with the end portions 278 of the pins during table rotation and functions to direct each pin toward the washer feeder 244 and into engagement with the nuts. The washer feeder 244 is disposed arcuately intermediate the guide 211 such that the pin will engage the feeder prior to the nut and is constructed similarly to the washer feeder outlet shown in FIGURE 7. A cam surface 318 is formed on the feeder and is engageable with the end portion 278 of the pin 276. An edge 324 is formed by the surface 318 and a recess 320. The recess 320 is adaptable to receive the washers 312 directed therein by a track 322 formed in the outlet 344 with the width of the recess being substantially equal to the width of the washers. The washers are fed to the feeder outlet by a hopper and feeder arm (not shown) in a similar manner as the nuts are fed to the recesses 306.

The ejecting structure 332 (FIGURE 10) is disposed adjacent the table and comprises an arm member 350 disposed radially intermediate the nut recess portions of the table and the pickup units. The arm 350 is so positioned as to redirect the movement of the pin 276 and plunger 252 into the housing 248 of the unit 246 against the force of the coil springs disposed therein. This movement of the units induced by the arm 350 effects engagement of the cam base portion 220 and repositions the washer pickup units for subsequent assembly operation. A ramp 352 formed in the unit 332 is disposed intermediate the arm and the nut recesses 306 and is operable to engage the washer as secured to the nut. Upon engagement of the washer, the ramp lifts the assembled unit from the recess and projects it away from the rotating table.

The operation of the machine can be summarized as being substantially identical to the operation of the machine utilized in assembling the bolt and washer unit. For explanation purposes, one assembly will be considered. Suitable means (not shown) effects rotation to the table 226 in a clockwise direction causing the pin 276 to engage the stationary guide 211. Upon further rotation of the washer pickup unit 246, the pin contacts the feeder outlet 244 and is directed radially inwardly by the cam surface 318. The pin 276 acting against the force of the spring 268 disposed within the chamber 266 of the plunger 252 moves radially inwardly within the opening 272 and passageway 270 of the plunger until the end 278 of the pin reaches the edge 324 of the surface 318 of the feeder and responds in a radially outward direction causing the telescoping engagement of the washer by the pin end in the recess 320 of the feeder outlet.

The pickup of the washer from the feeder is accomplished in the identical manner as the washer pickup in the bolt type fastener operation. This particular feature of the invention is common to all types of machines utilizing the novel washer pickup device with the only changes being in the size of the diameter of the pin. The pin diameter is entirely dependent upon the washer diameter and is therefore a predetermined variable. Continued rotation of the washer pickup unit directs the pin to engage the guide 211 which still maintains the pin inwardly directed against the spring 268 compressing same within the chamber 266 whereby upon reaching the end of the guide 211, the spring responds effecting a radially outwardly directed movement of the pin to telescopingly engage the extended flange portion 310 of the nut. At this point, the washer and nut is ready for the final assembly and securing operation. As the near maximum rise 222 of the cam 216 is reached by the plunger end portion 264, the washer 312 and nut 304 are positioned for assembly by the outward radial movement of the plunger 252 whereby the surface 274 of the plunger end remote from the cam transfers the washer from the pin end portion onto the flange 310 of the nut. Subsequently, the assembling takes place at the maximum rise of the cam by the forcing of the pin end 278 radially outwardly against the shoulder 310 by the engagement of the pin with the end member 264 in the chamber 266 until the diameter of the shoulder is greater than the smallest diameter of the washer. This movement by the pin in deforming the flange 310 can be termed a staking operation and it is peculiar to nuts rather than bolts in the assembly thereof with washers. The plunger 252 upon further rotation of the wheel retracts into the housing due to the reaction of the spring 254 disposed within the chamber 250 of the housing and due to the engagement of the fall 220 of the cam by the end portion 264 of the plunger. The complete assembly will next engage the ejecting structure 332 illustrated in FIGURE 10 whereby the washer and nut assembly unit will rotate with the wheel until the projecting arm 350 of the ejecting unit is extended between the end 278 of the pin 276 and the washer and nut assembly. The pin is redirected radially inwardly by the ejecting unit whereby the plunger is moved radially inwardly against the base circle of the cam. The space between the extending arm 350 of the ejecting unit allows the assembled unit to ride the ramp 352 formed thereon lifting the washer and nut out of the notch 306 in the rotating table 226 and project same into a suitable hopper located adjacent the machine (not shown).

The feeder units are substantially the same as used in the bolt and washer assembling machine and can be worked by gravity or similar mechanisms directing the positioning of the nut and the washers to the machine for assembly thereby. In this particular application, it is necessary that the feed of the washer and nut be along the circumferential surface of the rotating wheel prior to the engagement of the maximum rise portion of the cam 216 to allow the end of the pin 276 sufficient time to complete the assembly by performing the flange deforming or staking operation. The staking operation is appropriate only to the nut and washer assembly and accordingly, can be incorporated into other specific applications of the assembling machine when it is necessary for the above type of assembly.

While the present invention has been described in connection with certain specific embodiments, it is to be understood that the foregoing description is merely exemplary and that the concept of this invention is susceptible of numerous other modifications, variations, and applications which will be apparent to persons skilled in the art. The invention is to be limited, therefore, only by the broad scope of the appended claims.

I claim:

1. Apparatus for assembling fasteners with washers comprising a rotatable table, said table having means thereon for carrying fasteners in fixed radially inwardly projected position for assembly, washer carrying means disposed on said table radially spaced from and in radial alignment with said fastener carrying means, means cooperable with said washer carrying means operable to impart radial outward movement thereto assembling said washer with said fastener and means operable to effect rotation of said rotatable table.

2. A machine for assembling fasteners with washers comprising a rotatable table, fastener carrying means circumferentially spaced on said table, outward radially movable washer carrying means disposed on said table radially spaced from and in alignment with said fastener carrying means, said fastener carrying means and said washer carrying means mounted for conjoint rotation with said table, means cooperable with said washer carrying means imparting radial movement thereto and effecting the assembly of said washer with said fastener and means for imparting rotative movement to said table.

3. A machine for assembling fasteners with washers comprising a rotatable table having fastener carrying means disposed thereon, said fastener carrying means circumferentially spaced on said table and mounted for conjoint rotation therewith, movable washer carrying means circumferentially spaced on said table and radially spaced from said fastener carrying means, said movable washer carrying means being radially spaced from and in alignment with said fastener carrying means and mounted for conjoint rotation with said table, means engageable with said washer carrying means operable to impart outward radial movement to said movable washer carrying means effecting telescoping assembling engagement of said fastener with said washer and means for imparting rotative movement to said table.

4. Apparatus for assembling fasteners with washers comprising an arcuately movable table, fastener carrying means disposed on said table and movable axially relative thereto, washer holding means radially spaced from said fastener holding means and operable for radial movement on and conjoint movement with said table, actuating means engageable with one end of said washer carrying means effecting radial movement thereto, said washer carrying means comprising a reciprocating means responsive to said actuating means effecting washer pickup and assembly with said fastener, said washer carrying means being fixed in radial alignment with said fastener carrying means whereby alignment of said washer with said fastener is maintained during the assembling thereof and means operable to effect arcuate movement in said table.

5. A machine for assembling fasteners with washers comprising an arcuately movable table having fastener carrying means thereon, movable radially outward washer carrying means disposed on said table radially spaced from said fastener carrying means, actuating means engageable with one end of said washer carrying means operable to impart radial movement thereof and effect assembly of said washer with said fastener and actuating means effective to impart arcuate movement to said table, said washer carrying means comprising reciprocating means responsive to said actuating means operable to engage said washer thereon, said reciprocating means being radially movable whereby movement thereof in a radially outward direction effects washer engagement and assembly of said fastener with said washer.

6. A machine for assembling fasteners with washers according to claim 5 wherein said reciprocating means comprises a cylindrical pin movable in a passage formed in said washer carrying means operable to telescopingly engage a washer thereon and having a diameter less than the diameter of said washer.

7. A machine for assembling fasteners with washers according to claim 5 wherein said radially outward movement of said reciprocating means effects washer pickup only when said table is rotating.

8. A machine for assembling fasteners with washers comprising a base, a rotatable table fixed to said base, fastener holding means disposed on and axially movable relative to said table, fastener feeding means disposed adjacent said table operable to supply fasteners to said fastener holding means, washer carrying means radially spaced from and in alignment with said fastener holding means and capable of radial movement on said table, actuating means engageable with said washer carrying means operable to effect said radial movement and means connected to said table effecting rotation thereof, said washer carrying means comprising a radially reciprocable means responsive to said actuating means, washer feeding means disposed adjacent said table operable to supply washers therethrough, said radially reciprocable means engageable with said washer feeding means responsive to said actuating means operable to effect washer pickup with said washer carrying means operable to transfer said washer from said reciprocable means onto said fastener effecting assembly thereby.

9. A machine for assembling fasteners with washers according to claim 8 wherein said table has a multiplicity of washer carrying means and fastener holding means thereon with the number of washer carrying means equalling the number of fastener holding means.

10. A machine for assembling fasteners with washers according to claim 8 wherein said actuating means comprises a stationary cam having its axis disposed coincident with the axis of rotation of said rotatable table and wherein said cam is disposed at an acute angle with said base.

11. A machine for assembling fasteners with washers according to claim 8 wherein said washer feeding means has an outlet thereon disposed radially intermediate said fastener holding means and said washer carrying means and being radially coincident therewith.

12. A machine for assembling fasteners with washers comprising a base, a rotatable table fixed to said base, fastener and washer carrying means disposed on said table, said washer carrying means being radially movable thereon and cooperable with said fastener carrying means responsive to said movement to effect assembly of said washer with said fastener, actuating means engageable with said washer carrying means operable to effect said radial movement and means operable to rotate said table, said washer carrying means comprising a first and second reciprocable member, said first member engageable with said actuating means, said second member being responsive to movement of said first member through resilient means disposed therebetween, fastener and washer feeding means disposed adjacent said table, cam means effective to move said second member radially inwardly whereby said second member engages said washer feeding means effective to displace a washer therefrom, said first and second members being operable to transfer said washer from said second member to said fastener.

13. A machine for assembling fasteners with washers comprising a base, a rotatable table fixed to said base, fastener carrying means disposed on said table, means disposed adjacent said table for feeding fasteners to said fastener carrying means, washer carrying means radially spaced from and in alignment with said fastener carrying means disposed on said table operable for radial movement thereon, actuating means engageable with said washer carrying means, means disposed adjacent said table for feeding washers to said washer carrying means and means to effect rotation of said table, said washer carrying means comprising a first and second reciprocable member, said first member being engageable with said actuating means, said second reciprocable member being responsive to movement of said first member through resilient means disposed therebetween and having an end portion thereon operable to engage said washer feeding means and said fastener, cam means engageable with said second reciprocable member to move it radially inward to a position preceding washer pickup said second reciprocable member upon radial outward movement responsive to movement in said first member being operable to effect washer pickup and fastener engagement whereby said fastener upon contact with said second reciprocable member effects radial inward movement thereof opposite to said movement of said first reciprocable member directing engagement of said washer with said first member and transfer from said second member to said fastener by said first reciprocable member with said first reciprocable member operable to effect assembly of said washer with said fastener.

14. A machine for assembling threaded fasteners with washers comprising a base, a rotatable table disposed on said base having fastener and washer carrying means thereon, said washer carrying means being radially movable on said table and radially spaced from and in alignment with said fastener carrying means, feeding means disposed adjacent said table operable to supply fasteners and washers to said carrying means, actuating means engageable with said washer carrying means operable to effect said radial movement thereto and means effective to rotate said table, said washer carrying means comprising a first and second reciprocable member, said first member being engageable with said actuating means operable to be radially moved outwardly thereby, said first member transmitting said movement to said second member through a resilient means disposed therebetween with said second member being engageable with said washer feeder, said washer and said fastener responsive to said movement, means engageable with said second member, preceding washer pickup thereby, to move said second member radially inward to a location adjacent said washer feeding means, said first member being engageable with said washer and said fastener upon actuation thereof with said first member being operable to transfer said washer from said second member to said fastener effecting assembly thereby.

15. A machine for assembling threaded fasteners with washers comprising a base, a rotatable table disposed on said base having fastener and washer carrying units thereon, said washer carrying unit being radially movable on said table and radially spaced from and in alignment with said fastener carrying unit, said fastener carrying unit comprising a first reciprocating plunger disposed in said table having a recess adaptable to receive a fastener, said plunger being operable for movement axially with respect to said table and responsive to a first cam member engageable therewith, feeding means disposed adjacent said table operable to supply fasteners to said first plunger and washers to said washer carrying unit, a second cam member engageable with said washer carrying unit being operable to effect said radial movement thereto and means effective to rotate said table, said washer carrying unit comprising second and third plunger members, said second plunger member being engageable with said second cam operable to be radially moved outwardly thereby and operable to transmit said movement to said third plunger member through resilient means disposed therebetween, third plunger cam means, said third plunger member engageable with the plunger cam means therefore to effect engagement thereof with said washer feeder, said second plunger member being engageable with said washer and said fastener upon radial outward actuation thereof with said movement of said first plunger in an axial direction, said plungers being engaged by their respective cams in timed relation to one another to prevent interference engagement therebetween in effecting a transfer of said washer from said third plunger onto said fastener in final assembly relationship.

16. A machine for assembling fasteners to washers according to claim 15 wherein said fastener is of the bolt or screw type comprising a head and body portion and wherein said radial movement of said second plunger member extends outwardly until said washer is in engagement with said bolt or screw head.

17. A machine for assembling fasteners with washers according to claim 15 wherein said third plunger comprises a substantially cylindrical member having a diameter less than the diameter of said washer.

18. A machine for assembling fasteners with washers comprising a base, a rotatable table disposed on said base having fastener and washer carrying units thereon, said washer carrying unit being movable on said table and in radial alignment with said fastener carrying unit, a cam member engageable with said washer carrying unit operable to effect a radial movement thereto with said units being cooperable to effect assembly of said washer with said fastener responsive to said movement of said washer carrying unit and means operable to rotate said table, said fastener comprising a nut having an opening therein, and a deformable annular flange extending from said nut about said opening, said washer carrying unit comprising first and second reciprocable members, said first member engageable with said cam for movement thereby, said second member responsive to movement of said first member through resilient means disposed therebetween, cam means for actuating said second member radially inward said nut and washer feeding means disposed adjacent said table, said second member engageable with said washer feeding means subsequent to cam means movement thereof effective to displace a washer therefrom upon reciprocation effected by said washer feeder and operable to telescopingly align said washer with said nut, said cam member being effective to move said first member into engagement with said washer on said second member to transfer said washer therefrom to the deformable flange of said nut and said second member into engagement with said flange to deform said flange effecting permanent assembly of said washer to said nut.

19. A machine for assembling fasteners with washers comprising a base, a rotatable table disposed on said base having a multiplicity of fastener and washer carrying units thereon, said washer carrying unit being movable on said table and in radial alignment with said fastener carrying unit, a cam member engageable with said washer carrying unit operable to impart radial movement thereto with said units being cooperable to effect assembly of said washer with said fastener responsive to said movement of said washer carrying unit and means operable to rotate said table, said fastener comprising a nut having a threaded opening therein, and a deformable annular flange extending from said nut about said opening, said fastener carrying unit comprising a recess formed in said table extending parallel to the axis of rotation of said table and adapted to receive a fastener therein in radially disposed position on the machine, said washer carrying unit comprising first and second reciprocable members, said first member engageable with said cam member, said second member responsive to movement of said first member through resilient means disposed therebetween, cam means engageable with said second member effective to move it radially inward preceding a washer pickup operation thereof said nut and washer feeding means disposed adjacent said table, said second member engageable with said washer feeding means effective to displace a washer therefrom upon reciprocation induced therein by said cam means, said nut feeder operable to gravitationally position said nut in said recess, said second member operable to telescopingly align said washer with said nut, said first member effective to engage said washer therefrom to said deformable flange of said nut with said second member being operable to deform said flange effecting permanent assembly of said washer with said nut.

20. A machine for assembling fasteners with washers according to claim 19 wherein said second reciprocable member comprises a cylindrical pin disposed in said first member having a diameter less than the diameter of said washer, an end portion on said pin being frusto-conical in design having a surface thereon operable as a staking sleeve when in engagement with said deformable flange on said nut.

References Cited in the file of this patent
UNITED STATES PATENTS

| | | |
|---|---|---|
| 272,877 | Harvey | Feb. 27, 1883 |
| 2,698,478 | Heisterkamp et al. | Jan. 4, 1955 |